US009158436B2

(12) United States Patent
Varenhorst et al.

(10) Patent No.: US 9,158,436 B2
(45) Date of Patent: Oct. 13, 2015

(54) SYSTEMS AND METHODS FOR UPLOADING FILES TO A SERVER (71) Applicant: Dropbox, Inc., San Francisco, CA (US)

(72) Inventors: Chris Varenhorst, San Francisco, CA (US); Dan Wheeler, San Francisco, CA (US); Brain Smith, San Francisco, CA (US); Aston Motes, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 28 days.

(21) Appl. No.: 13/723,334

(22) Filed: Dec. 21, 2012

(65) Prior Publication Data
US 2014/0108956 A1  Apr. 17, 2014

Related U.S. Application Data (60) Provisional application No. 61/712,608, filed on Oct. 11, 2012.

(51) Int. Cl.
*G06F 3/00* (2006.01)
*G06F 3/0484* (2013.01)
*G06F 17/30* (2006.01)

(52) U.S. Cl.
CPC ...... *G06F 3/04842* (2013.01); *G06F 17/30861* (2013.01)

(58) Field of Classification Search
CPC .............. G06F 3/0481; G06F 3/04842; G06F 17/30861
USPC ........................... 715/740, 748; 709/217, 219
See application file for complete search history.

(56) References Cited

U.S. PATENT DOCUMENTS 7,668,880 B1 * 2/2010 Carroll ........................ 707/640
2013/0013745 A1 * 1/2013 Whittick et al. .............. 709/219

OTHER PUBLICATIONS

Uploadthingy.com screen caps, 2011, Uploadthingy.pdf, 3 pages.*
SugarSync user guide, 2011, SugarSync_User_Guide.pdf, 116 pages.*
Uploadthingy.com screen caps, 2011, Uploadthingy.pdf, 4 pages.*

* cited by examiner

*Primary Examiner* — Haoshian Shih
(74) *Attorney, Agent, or Firm* — Novak Druce Connolly Bove + Quigg LLP (57) ABSTRACT

A file upload widget is provided on a website to enable the upload of files to a website from an account within a content management system. The file upload widget may be used to: (1) allow a user to select files from a content management system, such as a synced online content management system; and (2) initiate the upload of the files directly from the content management system to the website. In various embodiments, this may: (1) allow the user to upload files that are not stored locally on the computing device being used to access the file upload widget; and (2) allow the user to complete the upload of files by initiating the transfer of files and then logging off of the website (and/or powering down their computing device) before the transfer of files is complete, which may result in a more convenient and enjoyable upload process.

13 Claims, 5 Drawing Sheets

SYSTEMS AND METHODS FOR UPLOADING FILES TO A SERVER

CLAIM OF PRIORITY

This claims the benefit of priority under 35 U.S.C. §119(e) to U.S. Provisional Patent Application 61/712,608, filed Oct. 11, 2012, entitled, "Systems and Methods for Uploading Files," which is incorporated herein by reference in its entirety.

BACKGROUND

To upload content to a website, such as a photo sharing website, a user typically uploads the content to the website from a local computing device on which the content is currently stored. This upload process can be extremely time consuming—especially when large photo or video files are involved. Current systems typically also require content to be stored locally before the content can be uploaded, which can be impractical for large amounts of content, or for devices such as smart phones, which may have limited local memory. Accordingly, there is currently a need for improved systems and methods for uploading content to one or more servers associated with a website, or other remote computers.

SUMMARY

A computer-implemented method, according to various embodiments, may include providing a file upload widget on a website. In response to activation of the file upload widget on the website, the computer-implemented method may enable a selection of a particular file from an account of a user within a synced online content management system. In response to the selection of the particular file from the account, the system may upload the particular file from the account within the online content management system to the website.

A computer-implemented method, according to certain embodiments, may include providing a file upload widget on a website. In response to the file upload widget being activated by a user, the computer-implemented method may enable the selection, by the user, of a particular file from an account, within a synced online content management system, that is associated with the user. Finally, the computer-implemented method may enable uploading the file to one or more servers associated with the website.

A non-transitory computer-readable medium, according to various embodiments, stores computer-executable instructions for creating a file upload widget for use on a website. The file upload widget may be configured for enabling a direct upload of one or more files from an account that is associated with a user within a synced online content management system to the website.

BRIEF DESCRIPTION OF THE DRAWINGS

Various embodiments of a computer system for uploading files are described below. In the course of this description, reference will be made to the accompanying drawings, which are not necessarily drawn to scale, and wherein.

DETAILED DESCRIPTION

Various embodiments now will be described more fully hereinafter with reference to the accompanying drawings. It should be understood that the invention may be embodied in many different forms and should not be construed as limited to the embodiments set forth herein. Like numbers refer to like elements throughout.

System Overview

Various embodiments use a file upload widget to facilitate the upload of one or more files to one or more servers associated with a website. In particular embodiments, the file upload widget may be used to: (1) allow a user to select one or more files (e.g., music files, video files, or photos) from a content management system, such as a synched or non-synched online content management system; and (2) initiate the upload of the file directly from the content management system to one or more servers associated with the website. In various embodiments, this may: (1) allow the user to upload files that are not stored locally on the user's computing device; and (2) allow the user to complete the upload of files by initiating the transfer of files and then logging off of the website (and/or powering down their computing device) before the transfer of files is complete, which may result in a more convenient and enjoyable upload process. The process may also allow for the website and/or the content management system to customize the upload process, which may result in a higher quality user experience. In certain embodiments, the upload process may be faster than an upload from a user's local computing device, because the files at issue may be transferred directly from the content management system's servers to the website's servers.

In various embodiments, the file upload widget may include a user interface element (e.g., a button, dialog box, menu bar, etc.) that allows a user to select and/or initiate the upload of one or more files. The file upload widget may be implemented, for example, by pasting a small piece of HTML code into the HTML code of a particular website. The code may be provided by the content management system.

Various embodiments may be particularly useful in conjunction with facilitating the upload of files from a synched, online content management system, such as the Dropbox™ Service, which is offered by Dropbox, Inc. of San Francisco, Calif. However, it should be understood that the system may be used in conjunction with any other suitable cloud-based or non-cloud based content management system.

More Detailed Discussion

Figure 1:
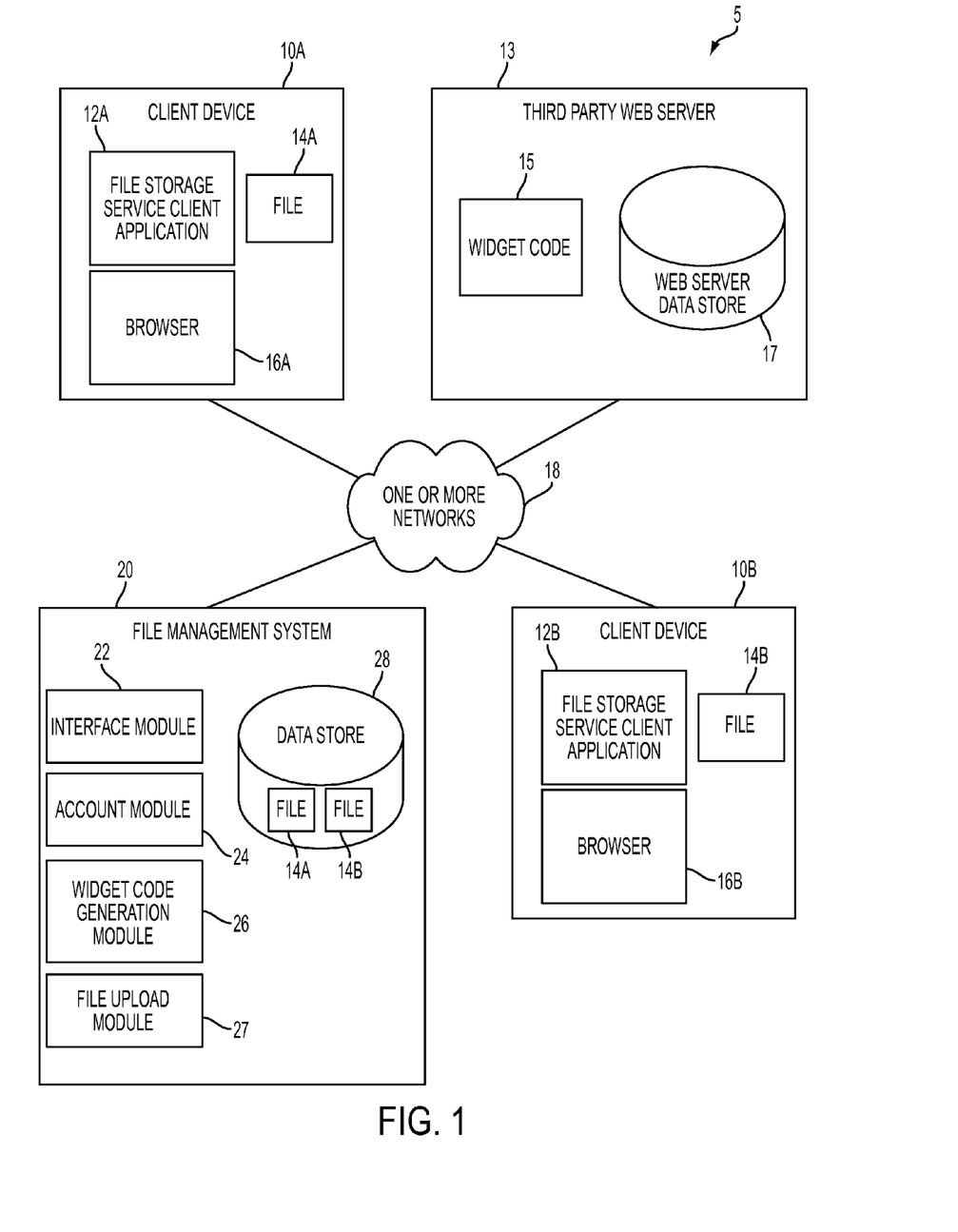
FIG. 1 shows a block diagram of a computing environment in which one or more widgets on a website can be used to upload files from a content management system, in accordance with a particular embodiment.

FIG. 1 shows content management environment 5 according to various embodiments. As may be understood from this figure, content management environment 5 includes a plurality of client devices 10A and 10B (collectively 10), a third party web server 13, and a content management system 20, which are all interconnected by one or more networks 18. Various aspects of the client devices 10, third party web server 13, and content management system 20 are discussed below.

Client Devices

In various embodiments, each client device 10 may selectively execute a file storage service client application 12A and 12B (collectively 12), which may be used to manage files stored within a content management system 20. It is noted that, in some embodiments, synchronized copies of files 14A and 14B may be kept on both content management system 20 and each respective client device 10. In some embodiments, client devices 10 may provide a file-browser type interface (not shown) for directly manipulating the files stored on content management system 20 without maintaining a local copy. Client devices 10 may also include a web browser 16A and 16B (collectively 16) for retrieving and presenting web pages (such as web pages associated with the third party web server 13) and other content from other webservers. Examples of suitable web browsers for use by the client devices 10 include FIREFOX®, GOOGLE CHROME™, INTERNET EXPLORER®, and SAFARI®.

Still referring to FIG. 1, while only two client devices 10A and 10B are shown for purposes of clarity, it should be understood by those skilled in the relevant field that many client devices may simultaneously connect through network(s) 18 to content management system 20 and third party web server 13 at any given time. Examples of suitable client devices 10 include, but are not limited to, a desktop computer, a mobile computing device such as a laptop, a tablet, and handheld devices, such as a smart phone (e.g., an IPHONE®, BLACKBERRY®, or ANDROID™-based smart phone). Each client device 10 may store a local, synched copy of one or more files from within content management system 20, and the files may be stored in any suitable file format. When file storage service client application 12 presents files that are stored within the file storage system to a user, the files may be arranged in folders and the folders themselves may be arranged in other folders, or in any other arbitrary arrangement supported by content management system 20, as determined by the user. However, one of skill in the art should understand in light of this disclosure that each user's file storage architecture may be considerably different from the next, and in some instances, the file storage architecture may be implemented to maximize storage and file retrieval efficiency.

Content Management System

Content management system 20 stores files and manages access to those files via client devices 10. Content management system 20 and its components may be implemented using any appropriate hardware and software for file serving, storage, and retrieval functions. For example, content management system 20 may be implemented in the form of a single server or multiple servers.

In various embodiments, content management system 20 includes interface module 22, account module 24, widget code generation module 26, file upload module 27, and data store 28. Each of these elements of content management system 20 is discussed below.

Content Management System—Interface Module

In particular embodiments, interface module 22 may facilitate file access and file storage between content management system 20 and client devices 10. Interface module 22 may receive files from and send files to client devices 10 consistent with the user's preferences for sharing files. Interface module 22 may act as the counterpart to a client-side file-explorer style user interface that allows a user to manipulate files directly stored on content management system 20. In some embodiments, software operating on client devices 10 may integrate network-stored files with the client's local file system to enable a user to manipulate network-stored files through the same user interface (UI) used to manipulate files on the local file system, e.g., via a file explorer, file finder or browser application. As an alternative or supplement to the client-side file-explorer interface, interface module 22 may provide a web interface for client devices 10 to access (e.g. via a suitable browser 16) and allow a user to manipulate files stored within content management system 20. In this way, the user can directly manipulate files stored within content management system 20.

Content Management System—Data Store

In various embodiments, data store 28 may store files such as those uploaded using client devices 10, or using any other suitable computing device. In the embodiment illustrated in FIG. 1, client 10A, which is associated with a first user, is shown as locally storing at least one file 14A, and client 10B, which is associated with a second user, is shown as locally storing at least one file 14B. As shown in FIG. 1, copies of the locally stored files are maintained in content management system's data store 28.

In various embodiments, data store 28 may maintain information identifying the user, information describing the user's file directory, and other information in a file journal that is maintained for each user. In some embodiments, the file journal may be maintained on content management system 20, and in other embodiments, a file journal (e.g., a "server-side file journal") may be maintained on both content management system 20 and locally on each client device 10. In various embodiments, the file journal may be used to facilitate the synchronization of the various copies of a particular file that are associated with a user's account.

As a particular example, in the embodiment shown in FIG. 1, the system may be configured so that any changes that are made to file 14A on particular client device 10A may also be automatically reflected in the copy of file 14A stored within content management system 20. Similarly, any changes that are made to file 14A on content management system 20 may also be automatically reflected in the copy of file 14A stored on client device 10A.

Content Management System—Account Module

In particular embodiments, account module 24 may track files stored in data store 28 and entries in the server-side file journal for each file. As users grant file access permissions to other users, account module 24 may update the server-side file journal associated with each relevant user in data store 20. Account module 24 may also track client devices 10 that are associated with each user's account. For example, a user may want to share all their files between their desktop computer, tablet computer, and mobile device. To make such a sharing arrangement seamless to the user, the user's single account on content management system 20 may be associated with each of the user's respective client devices. In some embodiments, an application running on each respective client device 10 may help to coordinate synchronization of files on the client device with corresponding versions of the files within the user's account in content management system 20, and also with corresponding versions of the files stored on the user's various other client devices.

Content Management System—Widget Code Generation Module

In particular embodiments, widget code generation module 26 may be configured to generate code that may be used to create a file upload widget on a third party website. In particular embodiments, this code may be HTML code that may be pasted into a third party website (or other website) to create the file upload widget. In particular embodiments, the file upload widget may include a button that may be used to: (1) select one or more files from a user's content management service (which may, for example, be cloud-based); and (2)

facilitate the upload of the selected files directly from the content management system to the third party website.

Figure 2:
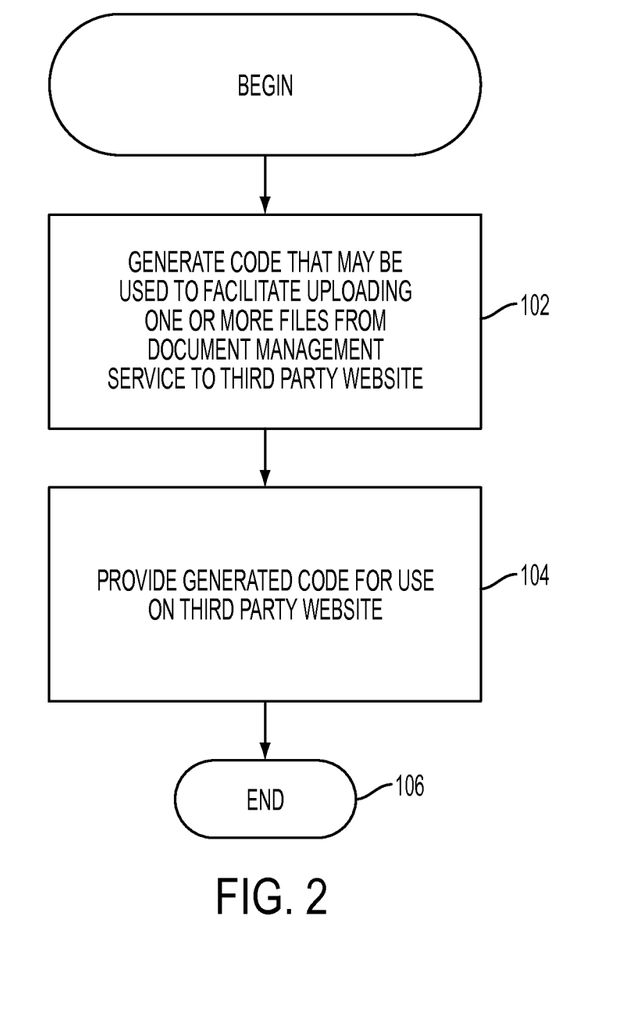
FIG. 2 shows a flow chart illustrating steps executed by a widget code generation module according to a particular embodiment.

FIG. 2 illustrates various steps that are executed by a widget code generation module 26 according to a particular embodiment. As may be understood from this figure, when executing module 26, the processing begins at Step 102, where content management system generates code that may be used to facilitate uploading one or more files from the content management system to a third party website. Next, at Step 104, the system provides the generated code for use on the third party website. The system may do this, for example, by displaying the generated code on a suitable display screen so that the user may copy the code in any suitable way. Finally, the system advances to Step 106 where it completes execution of widget code generation module 26.

Content Management System—File Upload Module

Figure 3:
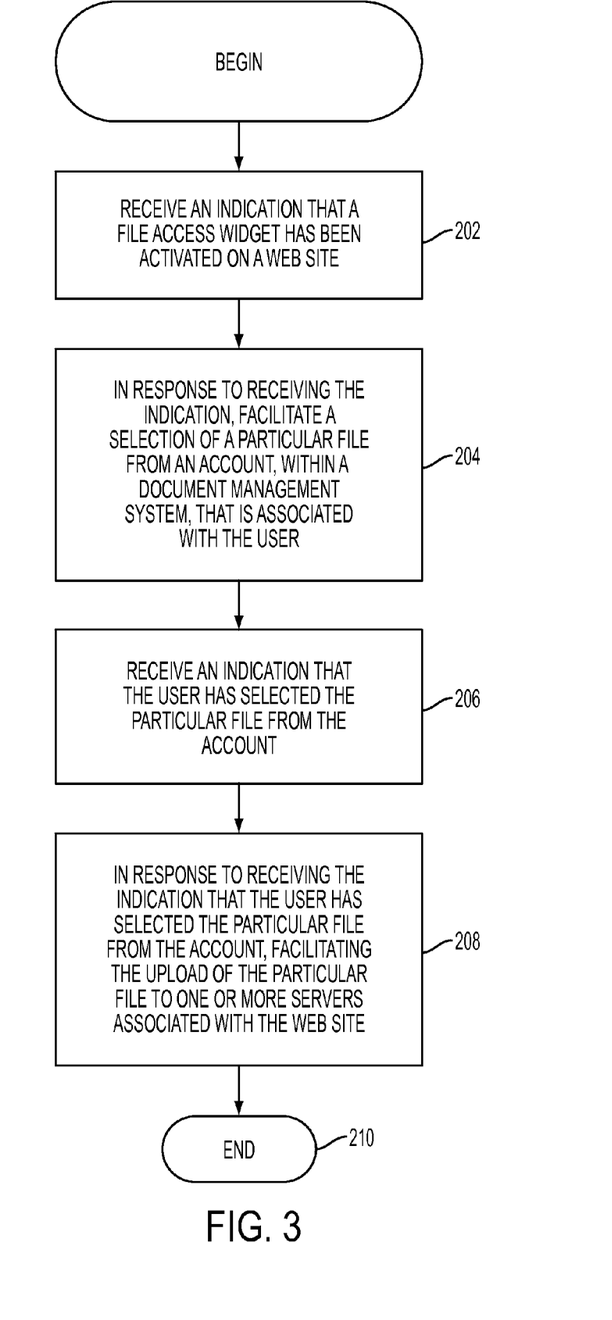
FIG. 3 shows a flow chart illustrating steps executed by a file upload module according to a particular embodiment.

FIG. 3 shows various steps executed by file upload module 27 according a particular embodiment. As may be understood from this figure, when executing this module, the process begins at Step 202, where the content management system receives an indication that a file upload widget has been activated on a third party website. This indication may, for example, come in the form of a request from the website that is generated in response to a user activating a file upload widget on the website (e.g., by selecting an "Upload From My Dropbox" button on the website).

Next, at Step 204, in response to receiving the indication, the system facilitates a selection of a particular file from an account that is associated with the user within content management system 20. The system may do this, for example, by displaying a file picker user interface within the user's browser and allowing the user to select one or more files from the user's account within content management system 20.

At Step 206, the system receives an indication that the user has selected a particular file from the account within content management system 20. Finally, in response to receiving the indication that the user has selected the particular file from the account, the system may facilitate the upload (or other transfer) of the particular file from content management system 20 to the website at Step 208.

In particular embodiments, the system may facilitate the transfer directly from content management system 20 to one or more servers (e.g., one or more third party web servers 13) associated with the website. In various embodiments, this may: (1) allow the user to upload files that are not stored locally on the user's computing device; and (2) allow the user to complete the upload of files by initiating the transfer of files and then logging off of the website (and/or powering down their computing device) before the transfer of files is complete, which may result in a more convenient and enjoyable upload process. The process may also allow for the website and/or the content management system to customize the upload process, which may also result in a higher quality user experience. In certain embodiments, the upload process may also be faster than an upload from a user's local computing device, since the files at issue may be transferred directly from the content management system's servers to the website's servers.

Exemplary User Experience

Figure 4:
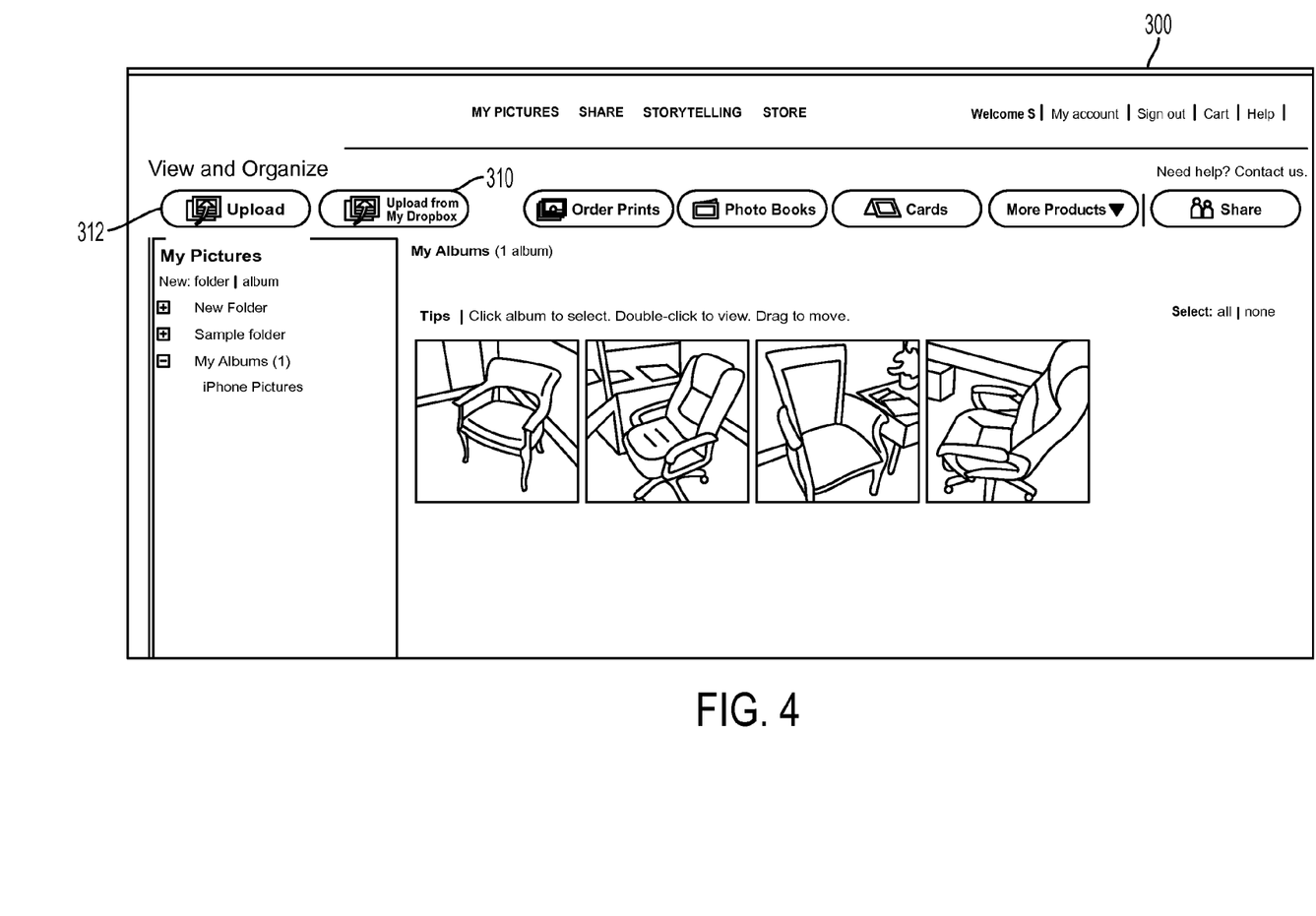
FIG. 4 shows a website that includes a file upload widget according to a particular embodiment.
Figure 5:
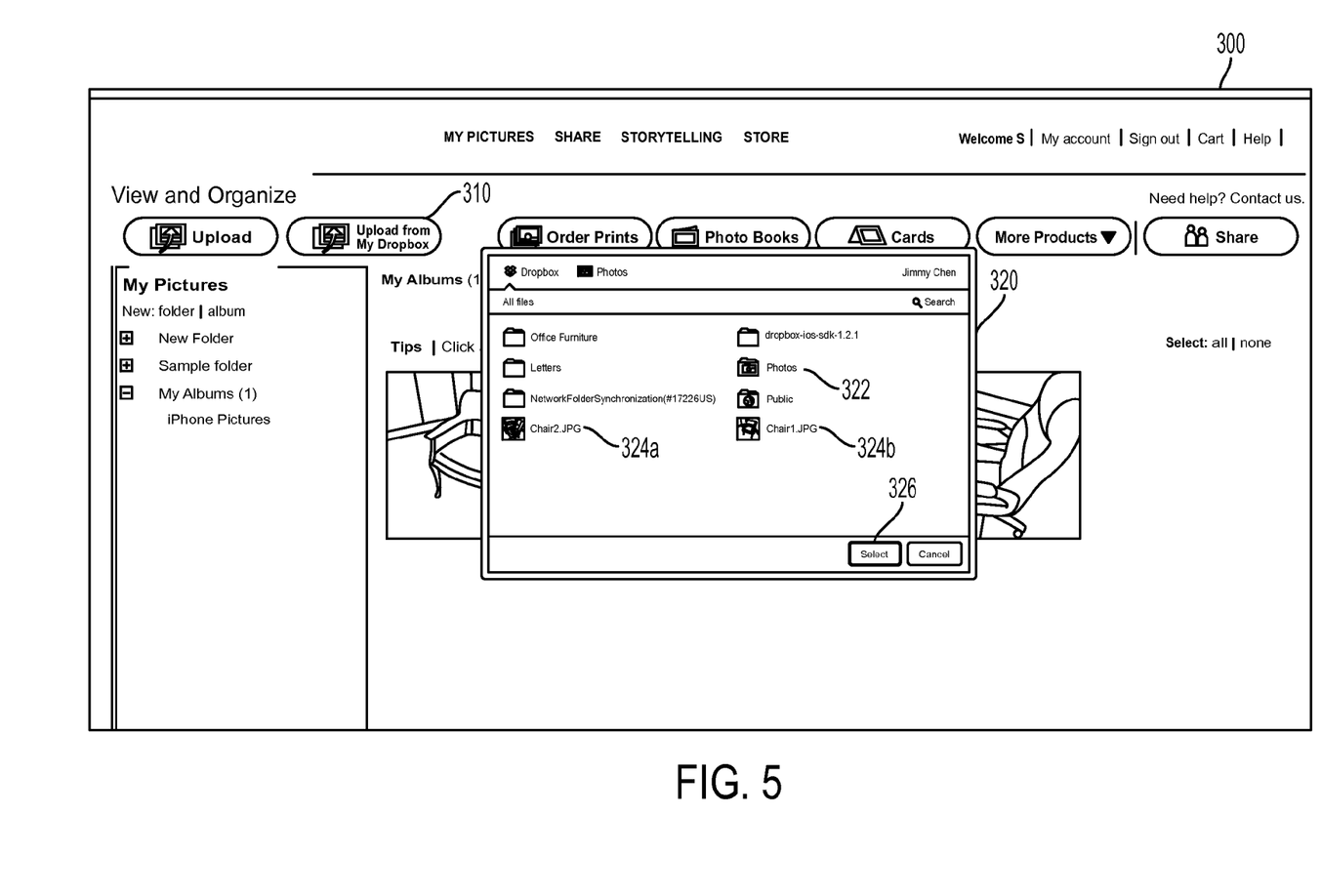
FIG. 5 shows a file selection interface according to a particular embodiment.

Exemplary user interfaces for a particular embodiment of a system for uploading one or more files from a content management system to a third party website are shown in FIGS. 4 and 5. These figures represent interfaces that may be displayed, for example, on any suitable computing device, such as a tablet computer, desktop computer, laptop, mobile device, or other computing device. As explained in greater detail below, such interfaces may be used by users of a particular content management system to upload files, such as documents or photos, to a third party website from the user's content management system account.

FIG. 4 is a screen shot of an exemplary user interface 300 on a third party photo sharing website. The website may allow users to upload their files into different folders or digital photo albums, and then—optionally—order physical copies of the photo albums. As may be understood from this figure, users may upload files from their computing device (e.g., smart phone, tablet, or desktop computer) to the website by selecting "Upload" Button 312 on the website. Using this button may invoke uploading of locally stored files to the website, and thus requires users to keep their computing device on while the files are being uploaded, and also requires that the user previously store the files on their computing device before the files are uploaded. This may be inconvenient and time consuming—especially when the user wishes to upload large numbers of files and/or large files to the third party site.

Alternatively, the user may select "Upload from My Dropbox" Button 310, which is integrated into the third party website, to upload one or more files to the website. In particular embodiments, the system may be configured, in response to the user's selection of "Upload from My Dropbox" Button 310, to display a file selection interface to the user, such as interface 320 shown in FIG. 5. In the embodiment shown in this figure, file interface 320 may include a listing of files stored in the user's content management system account (e.g., the user's Dropbox account) including individual files and folders.

As may be understood from this figure, the system may be configured to allow the user to utilize interface 320 to select files from the user's content management system account to upload to the third party website. The user may select individual files to upload to the third party website (e.g., such as "chair2.JPG" 324a or "chair1.JPG" 324b), or the user may select a folder of files to upload to the third party site (e.g., such as Photos folder 322). In various embodiments, the system may only display files and folders for selection by the user that satisfy certain predetermined criteria (e.g., the files are of a certain file type, are stored within a particular folder, or were created during a particular time period).

As shown in FIG. 5, once the user has selected one or more files to upload to the third party site, the user may activate (e.g., click on) Select Button 326. In response to the user activating Select Button 326, the system may initiate the upload of the selected files directly from content management system 20 to third party website server(s) 13. In various embodiments, the user may then immediately power off their computing device or navigate away from the third party website and the system may complete the upload of the files to the third party website without further input from the user. Once the system has completed the upload of the selected files and folders to the third party website (e.g., to a particular folder on the website), the selected files may be used in any manner provided by the third party website (e.g., in the case of a photo sharing website, sharing the photos with others, ordering prints of the photos, etc.).

Additional Configuration Considerations

The disclosure herein has been described in particular detail with respect certain embodiments. Those of skill in the art may appreciate that other embodiments may be practiced. First, the particular naming of the components and variables, capitalization of terms, the attributes, data structures, or any other programming or structural aspect may not be mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead be performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments disclosed herein include process steps and instructions described herein in the form of an algorithm. It should be noted that the process steps and instructions could be embodied in software, firmware, or hardware, and when embodied in software, could be downloaded to reside on and be operated from different platforms used by real time network operating systems.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for enablement and best mode of the present invention.

It also should be understood that, while various embodiments are described above in terms of computer-implemented methods, other embodiments include a system and/or a non-transitory computer-readable storage medium for creating and using file upload widgets to provide access to files stored on a content management system according to the techniques described above.

The embodiments disclosed herein are well suited to a wide variety of computer network systems over numerous topologies. Within this field, the configuration and management of large networks include storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure herein is intended to be illustrative, but not limiting, of the scope of the invention, which is set forth in the following claims.

What is claimed is:

1. A computer-implemented method comprising:
   providing, by a processor, a file upload widget on a third party website, the file upload widget being based, at least in part, on computer code provided by a synched online content management system; and
   in response to activation of the file upload widget on the third party website, initiating the synched online content management system to:
   receive selection of a particular file for uploading to the third party website, the particular file being stored locally on a client device associated with the user account;
   access a file journal describing files associated with the user account that are stored locally on the client device and in a datastore in the synched online content management system;
   initiate an upload of the particular file from the datastore to the third party website; and
   complete the upload of the particular file from the datastore to the third party website by allowing a user to initiate the upload and then log off the third party website or suspend interaction with the client device.

2. The computer-implemented method of claim 1, wherein uploading the particular file to the third party website comprises uploading the particular file directly from the online content management system to one or more servers associated with the third party website.

3. The computer-implemented method of claim 1, wherein uploading the particular file to the third party website comprises uploading the particular file directly from one or more servers associated with the online content management system to one or more servers associated with the third party website.

4. The computer-implemented method of claim 1, further comprising:
   receiving, by the synched online content management system, account information associated with the account; and
   using, by the synched online content management system, the account information to facilitate the selection of the particular file from the account.

5. The computer-implemented method of claim 1, wherein the file upload widget comprises a user interface element.

6. The computer-implemented method of claim 5, wherein the user interface element is a button.

7. A non-transitory computer-readable medium storing computer-executable instructions for:
   creating a file upload widget for use on a third party website, the file upload widget being created based, at least in part, on computer code generated by a synched online content management system, wherein:
   in response to activation of the file upload widget on the third party website, causing the synched online content management system to:
   receive a selection of a particular file for uploading to the third party website;
   access a file journal describing files associated with an account of a user that are stored locally on a user's device and that are stored in a datastore of the synched online content management system;
   initiate an upload of the particular file from the datastore to the third party website; and
   complete the upload of the particular file from the datastore to the third party website by allowing a user to initiate the upload and then log off the website or suspend interaction with the client device.

8. The non-transitory computer-readable medium of claim 7, wherein the third party website is not associated with the online content management system.

9. The non-transitory computer-readable medium of claim 7, wherein the online content management system is adapted to:
store the one or more files on a central server; and
at least substantially automatically synch any modified versions of the one or more files to corresponding versions of the one or more files on one or more client devices associated with the account.

10. The non-transitory computer-readable medium of claim 9, wherein facilitating the upload of the particular file to the third party website comprises enabling an upload of the particular file directly from the content management system to one or more servers associated with the third party website.

11. The non-transitory computer-readable medium of claim 10, wherein uploading the particular file to the website comprises receiving the particular file directly from the content management system.

12. A computer system comprising:
at least one processor associated with a synched online content management system; and
memory including processor-executable instructions configuring the computer system for:
in response to an activation of a file upload widget by a user on a third party website, initiating the processor to:
receive selection of a particular file for uploading to the third party website, the particular file being stored locally on a client device associated with a user account;
access a file journal describing files associated with the user account that are stored locally on the client device and in a datastore in the synched online content management system; and
initiate an upload of the selected particular file from the datastore to one or more servers associated with the third party website; and
complete the upload of the particular file from the datastore to the third party website by allowing a user to initiate the upload and then log off the third party website or suspend interaction with the client device.

13. The computer system of claim 12, wherein the uploading of the particular file to the one or more servers associated with the third party website comprises uploading the particular file at least substantially directly from the online content management system to the one or more servers.

* * * * *

UNITED STATES PATENT AND TRADEMARK OFFICE
CERTIFICATE OF CORRECTION

| | | |
|---|---|---|
| PATENT NO. | : 9,158,436 B2 | Page 1 of 1 |
| APPLICATION NO. | : 13/723334 | |
| DATED | : October 13, 2015 | |
| INVENTOR(S) | : Varenhorst | |

It is certified that error appears in the above-identified patent and that said Letters Patent is hereby corrected as shown below:

On the title page item [72], change "Brain Smith" to --Brian Smith--.

Signed and Sealed this
Twenty-fourth Day of May, 2016

Michelle K. Lee
*Director of the United States Patent and Trademark Office*